United States Patent
Lee

(10) Patent No.: US 7,505,672 B2
(45) Date of Patent: Mar. 17, 2009

(54) DYNAMIC SEARCHING METHOD AND DYNAMIC SEARCHING DEVICE OF STORAGE MEDIUM

(75) Inventor: Ji Na Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1137 days.

(21) Appl. No.: 10/746,009

(22) Filed: Dec. 26, 2003

(65) Prior Publication Data

US 2004/0139069 A1  Jul. 15, 2004

(30) Foreign Application Priority Data

Dec. 27, 2002  (KR)  ............... 10-2002-0084779

(51) Int. Cl.
*H04N 5/91* (2006.01)
(52) U.S. Cl. .................. 386/69; 386/70; 707/3
(58) Field of Classification Search .......... 386/69, 386/70; 707/3
See application file for complete search history.

(56) References Cited

U.S. PATENT DOCUMENTS

| | | | | |
|---|---|---|---|---|
| 5,809,201 A | * | 9/1998 | Nagasawa | 386/68 |
| 6,950,604 B1 | * | 9/2005 | Kato et al. | 386/98 |
| 2003/0093790 A1 | * | 5/2003 | Logan et al. | 725/38 |

FOREIGN PATENT DOCUMENTS

| | | |
|---|---|---|
| KR | 100199394 B1 | 3/1999 |
| KR | 1020020014857 | 2/2002 |
| KR | 1020020026099 A | 4/2002 |

\* cited by examiner

*Primary Examiner*—Thai Tran
*Assistant Examiner*—Girumsew Wendmagegn
(74) *Attorney, Agent, or Firm*—Lee, Hong, Degerman, Kang & Waimey

(57) ABSTRACT

Disclosed is a dynamic searching method including the steps of: extracting and storing index information of a stream receiving and storing an image source therein; extracting a shot change point from the index information; and performing a reproduction while varying a speed depending on a generation frequency of the shot change point.

14 Claims, 3 Drawing Sheets and B pictures and an index of a shot change point;
DYNAMIC SEARCHING METHOD AND DYNAMIC SEARCHING DEVICE OF STORAGE MEDIUM Pursuant to 35 U.S.C. § 119(a), this application claims the benefit of Korean Patent Application No. 10-2002-0084779 filed on Dec. 27, 2002, the content of which is incorporated herein by reference in its entirety.

BACKGROUND OF THE INVENTION

1. Field of the Invention

The present invention relates to a dynamic searching method and a dynamic searching device, and more particularly, to a dynamic searching method, and a dynamic searching device of a storage medium in which a stored program is reproduced at a high speed while a wanted point can be searched in a large capacity storage unit.

2. Description of the Related Art

Recently, as a multimedia is widely used, a demand for recording a variety of multimedia data of a mobile image, music, a still image and the like in a storage unit is increased.

Among the storage unit, tape media of a video tape, an audio tape and the like is mainly used, but a disc device such as a hard disc is recently increasingly used as a recording medium.

Currently, media such as a personal video recorder (PVR) having a large capacity digital storage unit such as the hard disc is generally used, and particularly, the PVR has an advantage in that reproduction can be repetitively performed without deterioration of a screen quality unlike a conventional VCR (video cassette recorder).

Further, as a technology develops, the storage unit tends to be in a large capacity, and a data compression rate is also increased to allow an image to be recorded into one storage unit up to several tens of hours.

Furthermore, the PVR has an advantage in that since access can be allowed to an arbitrary point on a characteristic of a digital device unlike the VCR, the reproduction can be not only performed at once for watching at a user's wanting point, but a reproduction function is performed at 50 to 100 times speed such that the wanted point can be easily searched for watching.

However, the above high speed reproducing function is merely to simply increase a reproduction speed to reduce a total searching time, and is not to facilitate to search the user's wanting point.

Accordingly, it is required to suggest a method and device for allowing the user's wanting point to be searched fast and easily.

SUMMARY OF THE INVENTION

Accordingly, the present invention is directed to a dynamic searching method and device of a storage medium that substantially obviates one or more problems due to limitations and disadvantages of the related art.

An object of the present invention is to provide a dynamic searching method and device of a storage medium in which a wanted scene of a recorded program can be searched fast while an exact point can be searched.

Another object of the present invention is to provide a dynamic searching method and device of a storage medium in which, when a program is stored in the storage medium, shot change information of the program is previously collected such that a user's wanting point can be searched at a dynamic time speed, not at a fixed time speed, by using a characteristic of the shot change information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a dynamic searching method including the steps of: extracting and storing index information of a stream receiving and storing an image source therein; extracting a shot change point from the index information; and performing a reproduction while varying a speed depending on a generation frequency of the shot change point.

In another aspect of the present invention, there is provided a dynamic searching method including the steps of: extracting a shot change point from index information of an inputted image source; acquiring a generation frequency of the shot change point by a user's search request; and reproducing the image source using the generation frequency of the shot change point as a determinant of a reproduction speed.

In a further another aspect of the present invention, there is provided a dynamic searching device of a storage medium, the device including: a data separating unit for receiving a bit stream representing a program to separate data into image, audio, additional information and the like; and an extracting and storing unit for extracting and storing at least information representing a shot change point where an identity of a corresponding program is varied, among the separated data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
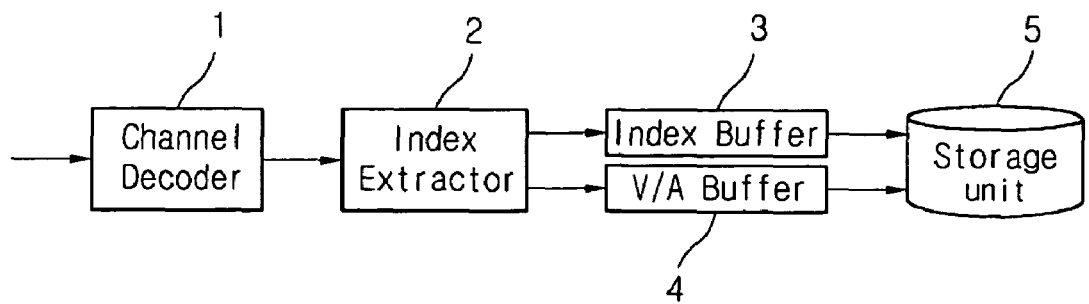
FIG. 1 is a view illustrating a dynamic searching device of a storage medium according to the present invention.

FIG. 1 is a view illustrating a dynamic searching device of a storage medium according to the present invention.

Referring to FIG. 1, the dynamic searching device of the storage medium according to the present invention includes a channel decoder 1 for selecting a bit stream receiving and storing an image source therein to separate data into image, audio, additional information and the like; an index extractor 2 for extracting index information from the separated data; an index buffer 3 and a V/A buffer 4 for temporarily storing an index and a V/A stream therein; and a storage unit 5.

The index information is to acknowledge an accessed point when the reproduction is performed at an arbitrary point among an image. The index information includes start points of I, P, B pictures and the like; a point having a shot change generated thereat; and a point having a time-discontinuity generated thereat.

The start points of the I, P and B pictures are the accessed points for reproducing corresponding pictures, and in case of a sequential reproduction, the pictures are sequentially read in a digital storage unit, but in case only I and P pictures are reproduced for a time-speed reproduction, the accessed points should be acknowledged.

In case of a high speed reproduction, it is desirable that only the I and P pictures are reproduced.

In case of a constant speed reproduction, since the reproduction is performed at a 10 times speed, a 20 times speed and the like for all durations, only the indexes of the I, P and B pictures are used to search positions of selected frames for reproduction.

The shot change point is acknowledged through analyzing a video feature, and is the accessed point for reproducing at the point where the scene conversion is generated.

The time-discontinuity point is generated when a recording time-continuity is broken by edition of combining other programs or deleting an advertisement inserted intermediately. The discontinuity point is stored for distinguishing the program, and can be included in the shot change information.

Figure 2:
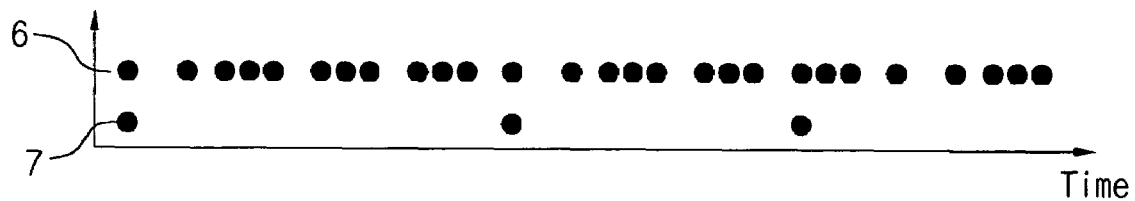
FIG. 2 is a view illustrating indexes of start points of I, P and B pictures and an index of a shot change point.

When the stored image data are arranged in a time sequence, the indexes 6 of the start points of the I, P and B pictures and the indexes 7 of the shot change points are represented as shown in FIG. 2.

As described above, the index information is previously extracted such that the reproduction can be performed at the dynamic time speed, not the fixed time speed, using information characteristic of the shot change point.

Figure 3:
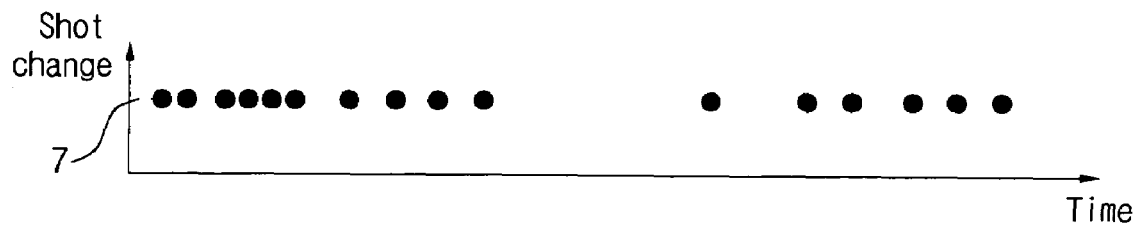
FIG. 3 is a view illustrating a generation frequency of a shot change point.

Herein, FIG. 3 illustrating only the index 7 of the shot change point is as below.

The shot change index 7 is not generated at the same time interval, and has a difference of the generation frequency according to an image kind.

For example, in case of the advertisement, since the advertisement is differently reproduced at an interval of approximately fifteen seconds and a screen construction method is different according to an advertisement kind, the shot change point is frequently generated at the duration in which the advertisement is represented.

To the contrary, in case of a discussion or interview program, since one person is spotlighted for a long time and a camera is static in its movement, the shot change point is scarcely represented.

Figure 4:
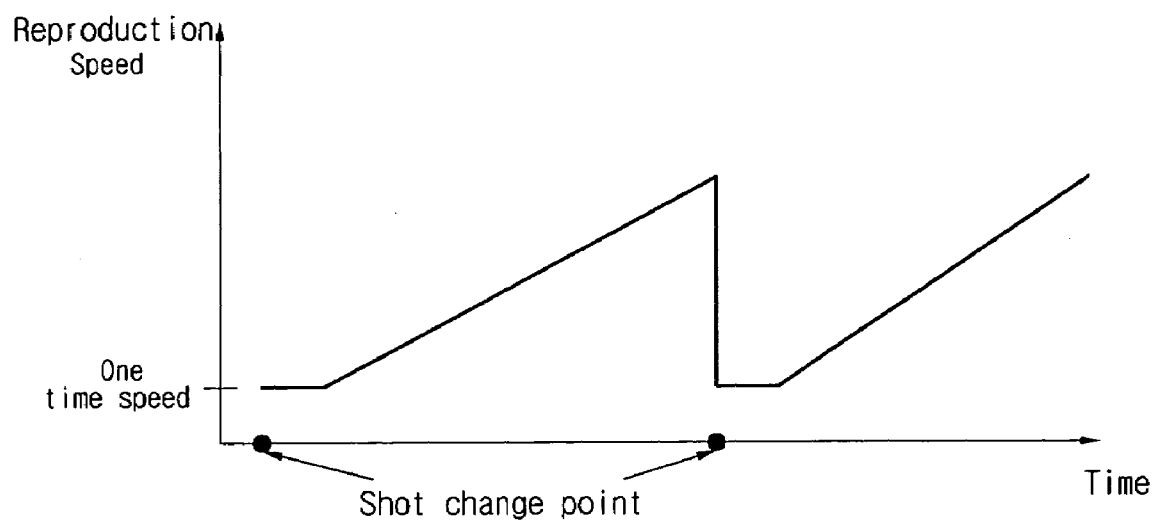
FIG. 4 is a view illustrating a dynamic searching method according to the present invention.

FIG. 4 is a view illustrating a dynamic searching method according to the present invention.

As shown in FIG. 4, a reproduction speed is differentiated centering on the shot change point. The reproduction speed is varied in a manner in which a normal speed reproduction is performed at the shot change point for a predetermined time, the reproduction speed is gradually increased, and then if the shot change is again generated, the normal speed reproduction is again performed.

Accordingly, since the normal speed reproduction is performed at the shot change point at which the scene is changed, the user can understand a content of a currently reproduction point and easily search his wanting scene.

However, since a frequency and a distribution of the shot change point are different depending on the image kind, it is difficult to effectively perform the search using only the above-described method.

As a direct example, in case the shot change point is continuously generated at a short time interval, since the shot change point is again represented before the normal speed increases, there is a drawback in that the reproduction is continued at the normal speed.

Figure 5:
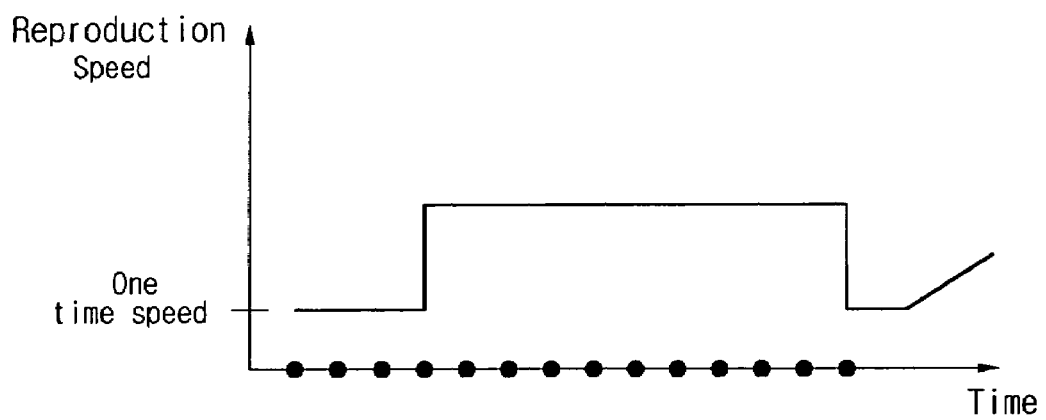
FIG. 5 is a view illustrating a dynamic searching method in case a generation frequency is high at a shot change point.

FIG. 5 is a view illustrating a dynamic searching method in case a generation frequency of the shot change point is high.

The shot change is generated several times within a short time due to the discontinuity of the stream itself such as the advertisement or due to a meaningless serious screen change.

In this case, it is desirable that the reproduction is fast performed rather than that the reproduction is slowly performed at respective shot change points since it is important that how the stream is at this duration.

Therefore, in case the shot change point is generated at the frequency of more than a constant interval, only first several shot changes are shown and the remnant is reproduced at a high speed.

Figure 6:
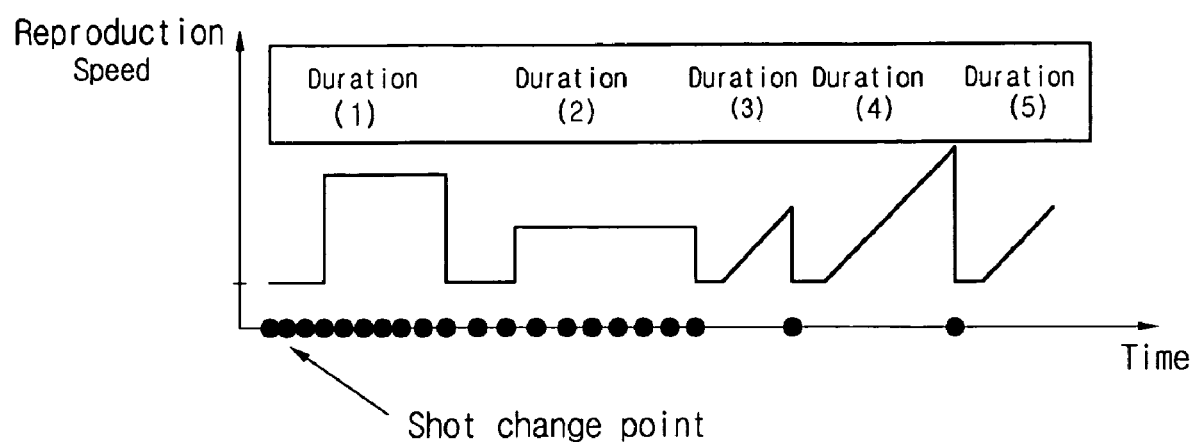
FIG. 6 is a view illustrating a dynamic searching method according to one embodiment of the present invention.

FIG. 6 is a view illustrating a dynamic searching method according to one embodiment of the present invention.

As shown in FIG. 6, it is desirable that the reproduction speed is varied depending on the generation frequency of the shot change so as to perform a dynamic search.

Since the shot change point is frequently generated at a duration 1, it is desirable that the reproduction is performed at a high speed as shown in FIG. 5. Since the shot change point is frequently generated at a duration 2, but a time interval is large in comparison with the duration 1, the reproduction is performed at the low time speed in comparison with the duration 1.

In case of durations 3, 4 and 5 where the shot change is not frequently generated, as shown in FIG. 4, a constant speed reproduction is performed at the shot change point, and then the reproduction is performed at the gradually increasing speed.

As described above, the present invention has an advantage in that in case the stored image is reproduced while the wanted point is searched, the reproduction is performed at various time speeds such that the user can search his wanting point fast and conveniently.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A dynamic searching method comprising:
   extracting and storing index information of a stream receiving and storing an image source therein;
   extracting a shot change point from the index information; and
   performing a reproduction while varying a speed depending on a generation frequency of the shot change point, wherein when a generation interval between the shot change points is more than a predetermined time, a low speed reproduction is performed for a predetermined time after a shot change is generated, and then a gradual high speed reproduction is performed until a shot change is generated.

2. The method according to claim 1, wherein the index information comprises start points of I, P and B pictures, a shot change point and a time-discontinuity point.

3. A dynamic searching method comprising:
   extracting and storing index information of a stream receiving and storing an image source therein;
   extracting a shot change point from the index information; and
   performing a reproduction while varying a speed depending on a generation frequency of the shot change point, wherein when the generation interval between the shot change points is continuously less than a predetermined time, a high speed reproduction is performed in proportion to the generation frequency.

4. The method according to claim 3, wherein the index information comprises start points of I, P and B pictures, a shot change point and a time-discontinuity point.

5. A dynamic searching device of a storage medium, the device comprising:
   a data separating unit for receiving a bit stream representing a program to separate data into image, audio, and additional information;
   an extracting and storing unit for extracting and storing at least information representing a shot change point where an identity of a corresponding program is varied, among the separated data; and
   a reproducing unit for reproducing at a low speed for a predetermined time after a shot change is generated, and then reproducing at a gradual high speed until when a shot change is generated when a generation interval between the shot change points is more than a predetermined time.

6. The device according to claim 5, wherein the extracted information further comprises information representing I and P frames among an image signal.

7. The device according to claim 5, wherein the extracting and storing unit comprises a storage unit and an index extractor for extracting index information.

8. The device according to claim 5, wherein the shot change point comprises a time-discontinuity point.

9. The device according to claim 5, wherein a time-continuity is intermitted by edition of the image source at the time-discontinuity point.

10. A dynamic searching device of a storage medium, the device comprising:
    a data separating unit for receiving a bit stream representing a program to separate data into image, audio, additional information;
    an extracting and storing unit for extracting and storing at least information representing a shot change point where an identity of a corresponding program is varied, among the separated data; and
    a reproducing unit for reproducing at a high speed in proportion to a generation frequency of the shot change point when a generation interval between the shot change points is continuously less than a predetermined time.

11. The device according to claim 10, wherein the extracted information further comprises information representing I and P frames among an image signal.

12. The device according to claim 10, wherein the extracting and storing unit comprises an index extractor for extracting index information, and a storage unit.

13. The device according to claim 10, wherein the shot change point comprises a time-discontinuity point.

14. The device according to claim 10, wherein at the time-discontinuity point, a time-continuity is intermitted by edition of the image source.

* * * * *